Aug. 15, 1961    E. J. HARDGRAVE, JR    2,995,932
DEVICE FOR MEASURING MACH NUMBER
Filed June 24, 1953

EVERETT J. HARDGRAVE, JR.
INVENTOR

BY
ATTORNEYS

2,995,932
Patented Aug. 15, 1961

2,995,932
DEVICE FOR MEASURING MACH NUMBER
Everett J. Hardgrave, Jr., Silver Spring, Md., assignor to the United States of America as represented by the Secretary of the Navy
Filed June 24, 1953, Ser. No. 363,783
5 Claims. (Cl. 73—212)

This invention relates to a measuring device and more particularly to a device for measuring the Mach number of a supersonic airstream. Inasmuch as the same flow conditions arise for a body passing through the air at supersonic speeds as for a body stationary with respect to the earth but being subjected to an airstream flowing at supersonic speeds, the term "supersonic airstream" shall, for the purposes of this invention, include both situations.

The mathematical relationships of static pressure, total pressure, density, speed etc. for low speed flow are based upon the valid assumptions of incompressible flow theory. However, high speed flow is characterized by compressibility such that the mathematical relationships depicting low speed flow do not apply. Moreover, the total pressure of a supersonic airstream cannot be measured directly by the conventional Pitot tube, and the commonly known static pressure tubes are less reliable for accurately determining the static pressure of the airstream. Therefore, the customary methods of determining the speed of a subsonic airstream are ineffective for measuring the speed of a supersonic airstream.

It is the principal object of this invention to provide a device for accurately measuring the Mach number of a supersonic airstream.

Another object of this invention is to provide a device capable of producing indications of pressure values from which the Mach number of an airstream may be accurately determined.

Further objects and attendant advantages of this invention will become evident from the following detailed description, taken in conjunction with the appended drawing, in which.

Figures 1, 2:
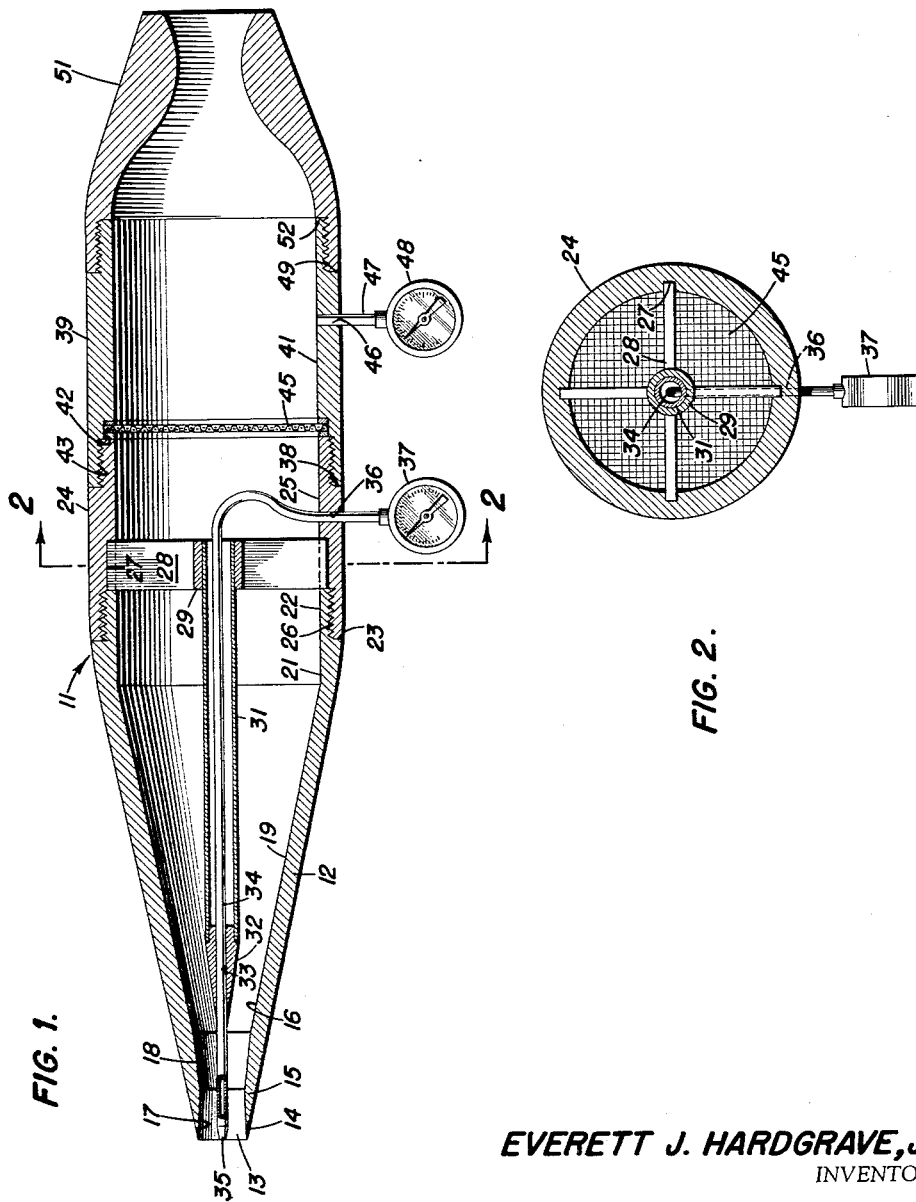
FIG. 1 is an axial section of a device constituting this invention.
FIG. 2 is a section on line 2—2 of FIG. 1.

In the exemplary embodiment of this invention as shown in FIGS. 1 and 2, a streamlined body 11 is comprised of four parts. The first of these parts, the diffuser section 12, is conically formed, having an inlet 13 with a sharp lip 14 at its convergent end 15, and a duct 16 defined by the inner wall of said section. The duct 16 includes a short cylindrical portion 17 connecting the inlet 13 with a short diverging portion 18 which, in turn, communicates with a longer diverging portion 19 having a larger angle of divergence. The duct 16 terminates in a cylindrical portion 21 open at the divergent end of the diffuser section 12. The divergent end portion 22 of the diffuser section 12 is reduced to define an external annular shoulder 23 and an externally threaded portion for a purpose to be described hereinafter.

The second part of the body 11 is the fore low velocity chamber section 24 which is cylindrically shaped, having a central duct 25. The forward end portion of this chamber section 24 is provided with an internal, annular recess 26 which is internally threaded to cooperate with the threaded divergent end portion 22 of the diffuser section 12. Pairs of opposed longitudinal grooves 27 are formed in the inner peripheral wall of the central duct 25 to accommodate four struts 28 joined at their inner ends by a sleeve 29. The divergent end portion 22 of the diffuser section 12, when connected to this chamber section 24, abuts the end portions of the struts 28 to retain them in position in the grooves 27.

A tube 31 is mounted in the sleeve 29 and extends coaxially towards the inlet 13, said tube terminating in spaced relation to said inlet. In the forward end of the tube 31 is fixed a tapered chuck 32 having a central bore 33 for receiving a Pitot tube 34 having an open end 35 disposed in the plane of the inlet 13. The Pitot tube extends rearwardly through the tube 31 to emerge from said tube at the approximate position of the struts 28. From the tube 31 the Pitot tube 34 is bent ninety degrees and extends laterally through a suitable opening 36 in the fore chamber section 24. A pressure indicating instrument 37, such as a gauge of the altimeter type or a manometer, is connected to the Pitot tube 34 to receive pressure sensations therefrom. The rear end portion of this chamber section 24 is reduced and externally threaded at 38 for connection to the third body part.

The third body part is the rear low velocity chamber section 39, formed with a cylindrical central duct 41 and an internal annular recess 42 and internal threads 43 on its forward end portion. In this case the recess 42 extends inwardly beyond the threads 43 and receives a circular flow straightening screen 45 which traverses the duct 41. The reduced, threaded portion 38 of the chamber section 24 is screwed on the forward end portion of this section 39 and abuts the screen 45 to hold it in position.

An opening 46 is provided in the wall of the chamber section 39 for accommodating a static pressure tube 47 perpendicular to the axis of said section. A pressure indicating instrument 48 is connected to the tube 47 to receive pressure sensations therefrom. The rear end portion of section 39 is reduced and externally threaded at 49.

The rearmost body part comprises a sonic discharge nozzle 51 having an internal, annular recess 52 on its forward end portion which is internally threaded for attachment to the chamber section 39.

In operation, the body 11 is alined in the airstream to be investigated with the inlet 13 facing the oncoming air. The Pitot tube 34 senses the impact pressure $P_t'$ of the airstream and the instrument 37 provides an indication of this pressure. Air from the airstream enters the inlet 13 and passes into the duct 16 where it expands and decelerates to subsonic speeds in the diffuser portion 12. From the diffuser portion 12 the slowed air flows into the chamber portions 24 and 39 past the flow straightening screen 45. The static pressure tube 47 senses the static pressure $P_c$ in the rear chamber 39 and transmits said pressure to the instrument 48 for providing an indication. Inasmuch as the air flowing in the chamber portions 24 and 39 is at a low subsonic speed, the static pressure $P_c$, as sensed by the tube 47 and measured by the instrument 48, is an accurate representation of the true static pressure in said chamber portions.

The measured impact pressure $P_t'$ and chamber static pressure $P_c$ may be related to the Mach number by equating the mass flow at the inlet 13 to that at the nozzle 51 as follows:

$$(g\rho VA)_{\text{inlet}} = (g\rho VA)_{\text{nozzle}}$$

where:

$\rho$ = density of the air
$V$ = velocity of flow
$A$ = cross-sectional area of the airstream
$g$ = acceleration due to gravity From the universal gas law, $P = \rho RT$, the density may be expressed in terms of pressure:

$$\rho = \frac{P}{RT}$$

wherein:

$R$ = the universal gas constant
$P$ = static pressure
$T$ = static temperature and from the definition of velocity of flow, $V = cM$ ($c$ being the speed of sound), and the representation for the speed of sound $c = \sqrt{RT}$, the velocity of flow may be expressed in terms of Mach number and temperature:

$$V = M\sqrt{\gamma RT}$$

in which:

$M$ = Mach number
$\gamma$ = specific heat ratio.

Converting the free stream temperature $T$ to the total temperature $T_t$, substituting these relationships into the massflow balance equation and inserting the coefficient of discharge $C_d$ on the nozzle side of the equation the following expression is obtained:

$$(A P_m^\circ T_t^{-1/2}) \text{ inlet} = (C_d A P_m^\circ T_t^{-1/2}) \text{ nozzle}$$

where $$\overset{\circ}{m} = g\sqrt{\gamma/RM}\left[1 + \frac{\gamma-1}{2}M^2\right]^{1/3}$$

Inasmuch as the total temperature of the air flowing into the inlet 13 and through the nozzle 51 is constant the factor $T_t^{-1/2}$ may be cancelled from the equation, $$(AP_m^\circ)_{\text{inlet}} = (AP_m^\circ)_{\text{nozzle}}$$

In order to inject terms representing the measured impact pressure $P_t'$ and static pressure $P_c$ into the equation the inlet side is multiplied by $P_t'/P_t'$ and the nozzle side by $$\left(\frac{P_t}{P_t'}\right)_c \frac{P_c}{P_c}$$

($P_t$ being the total pressure in the chamber and nozzle) and the terms rearranged as follows:

$$[(P/P_t'^\circ_m)AP_t']_{\text{inlet}} = \left[\left(\frac{P^\circ_m}{P_t}\right)\left(\frac{P_t}{P}\right)_c P_c A C_d\right]_{\text{nozzle}}$$

The term $$(P/P_t'^\circ_m)$$

can be expressed as a function of Mach number:

$$(P/P_t'^\circ_m) = \frac{2}{(\gamma+1)M^2}\left[\frac{2(2\gamma M^2 - \gamma + 1)}{(\gamma+1)^2 M^2}\right]\frac{1}{\gamma - 1} (^\circ_m)$$

and $(P_t/P)_c$ is a function of the ratio of the cross-sectional area of the chamber to that of the nozzle and, therefore, is constant. Since flow through a sonic discharge nozzle is at a Mach number equal to unity the term $$(P/P_{t\,m}^\circ)$$

on the nozzle side is constant. Therefore the mass flow balance equation can be rearranged as follows:

$$(P/P_t'^\circ_m)$$

$$= \left[\frac{A_{\text{nozzle}}}{A_{\text{inlet}}} \cdot (P/P_{t\,m}^\circ)_{\text{nozzle}}\left(\frac{P_t}{P}\right)_c C_d\right]\frac{P_c}{P_t'} = K\left(\frac{P_c}{P_t'}\right)_{\text{inlet}}$$

wherein $K$ designates a constant dependant upon the configuration and dimensions of the body 11 and the duct 16. The constant $K$ may be computed directly from the known dimensions of the body 11 and the duct 16 or it may be found empirically by placing said body in an airstream of known Mach number.

The values of $$(P/P_t'{}^\circ_m)$$

may be tabulated with corresponding values of Mach number; a sample tabulation being shown below:

Table I

| $(P/P_t')^\circ_m$ | Mach number |
|---|---|
| .5318 | 1.00 |
| .5198 | 1.20 |
| .4978 | 1.40 |
| .4751 | 1.60 |
| .4547 | 1.80 |
| .4371 | 2.00 |

Upon measuring the values of the impact pressure $P_t'$ and static pressure $P_c$ the term $$(P/P_t'{}^\circ_m)$$

will be determined from which the Mach number will be found by reference to a tabulation similar to that shown in Table I.

It is within the scope of this invention to utilize the pressures $P_t'$ and $P_c$ in a suitable meter to directly produce Mach number indications in accordance with the relationship as expressed in the equation developed hereinabove.

Obviously many other modifications and variations of the present invention are possible in the light of the above teachings. It is therefore to be understood that within the scope of the appended claims the invention may be practiced otherwise than as specifically described.

What is claimed is:

1. A device for indicating the Mach number of a supersonic airstream, comprising means including a divergent diffuser for capturing a portion of the airstream and slowing it to a subsonic speed, a low velocity chamber connected to said capturing means for receiving said slowed air, screen means mounted in said chamber for straightening said slowed air, a convergent-divergent nozzle for sonically discharging said slowed air from said chamber, means including a Pitot tube for measuring the impact pressure of the airstream at the entrance of said diffuser, and means for measuring the static pressure within said chamber downstream of said screen means.

2. A device for indicating the Mach number of a supersonic airstream, comprising a divergent diffuser in an open-ended body having a duct with an inlet facing the airstream for capturing a portion of the airstream and slowing it to a subsonic speed, a convergent-divergent nozzle at the downstream end of said duct for sonically discharging said airstream, means including a screen located between said diffuser and nozzle for straightening the captured portion of said airstream, means for measuring the impact pressure of said inlet, and means for measuring the static pressure within said duct downstream of said screen.

3. A device for indicating the Mach number of a supersonic airstream, comprising a body having a duct with an inlet facing the airstream, a diffuser section in said body for slowing the air entering the duct through said inlet, a chamber located downstream of said diffuser having screen means therein for straightening the slowed air from said diffuser, a Pitot tube mounted coaxially in said duct and having an open end disposed in the plane of said inlet facing the airstream, a static pressure tube opening into said duct downstream from said screen means, and an exit nozzle mounted on the downstream end of said duct for sonically discharging said airstream.

4. A device for indicating the Mach number of a supersonic airstream, comprising a body having an open-ended duct with an inlet for capturing a portion of said airstream, a divergent diffuser section connected to said inlet, a low velocity chamber connected to said diffuser section, a sonic discharge nozzle connected to said chamber for sonically discharging said airstream, a Pitot tube mounted coaxially in said body and having an open end disposed in the plane of said inlet facing the airstream, and a static pressure tube opening into said low velocity chamber.

5. An arrangement as set forth in claim 4, with additionally screening means mounted in said low velocity chamber for straightening the flow through said chamber.

References Cited in the file of this patent

UNITED STATES PATENTS

| | | |
|---|---|---|
| 1,085,184 | Weymouth | Jan. 27, 1914 |
| 1,426,698 | Zahm | Aug. 22, 1922 |
| 2,343,282 | Daiber | Mar. 7, 1944 |
| 2,441,042 | Stoll | May 4, 1948 |
| 2,482,701 | Anderson | Sept. 20, 1949 |
| 2,570,129 | Johnson | Oct. 2, 1951 |
| 2,592,176 | Orlin et al. | Apr. 8, 1952 |
| 2,592,322 | Nerod | Apr. 8, 1952 |
| 2,618,972 | Leduc | Nov. 25, 1952 |
| 2,641,105 | Drake | June 9, 1953 |

UNITED STATES PATENT OFFICE
CERTIFICATE OF CORRECTION

Patent No. 2,995,932                  August 15, 1961

Everett J. Hardgrave, Jr.

It is hereby certified that error appears in the above numbered patent requiring correction and that the said Letters Patent should read as corrected below.

In the grant, line 1, name of inventor, for "Everett J. Hartgrave, Jr. read -- Everett J. Hardgrave, Jr. --; column 4, lines 43 and 44, strike out "divergent diffuser in an open-ended" and insert the same after "having a" in line 44, same column 4.

Signed and sealed this 10th day of April 1962.

(SEAL)
Attest:

ERNEST W. SWIDER

Attesting Officer

DAVID L. LADD

Commissioner of Patents